US006647769B1

(12) United States Patent
Fujino et al.

(10) Patent No.: US 6,647,769 B1
(45) Date of Patent: Nov. 18, 2003

(54) FAILURE DIAGNOSTIC SYSTEM FOR ENGINE

(75) Inventors: Kenichi Fujino, Shizuoka (JP); Hitoshi Motose, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 96 days.

(21) Appl. No.: 09/696,060

(22) Filed: Oct. 25, 2000

(30) Foreign Application Priority Data

Oct. 26, 1999 (JP) .......................................... 11-304106

(51) Int. Cl.$^{7}$ .............................................. G01M 15/00
(52) U.S. Cl. ..................................................... 73/119 A
(58) Field of Search ............................... 73/116, 117.2, 73/117.3, 118.1, 119 A, 119 R

(56) References Cited

U.S. PATENT DOCUMENTS

| | | | | |
|---|---|---|---|---|
| 4,712,421 A | * | 12/1987 | Young | 73/119 A |
| 4,788,858 A | * | 12/1988 | Liebermann | 73/119 A |
| 4,977,872 A | | 12/1990 | Hartopp | |
| 5,000,043 A | * | 3/1991 | Bunch et al. | 73/119 A |
| 5,020,362 A | * | 6/1991 | Hart et al. | 73/119 A |
| 5,117,683 A | * | 6/1992 | Phillips | 73/119 A |
| 5,445,019 A | | 8/1995 | Glidewell et al. | |
| 5,535,621 A | | 7/1996 | Glidewell et al. | |
| 5,633,457 A | * | 5/1997 | Kilar et al. | 73/119 A |
| 5,770,796 A | * | 6/1998 | Sakamoto et al. | 73/113 |

* cited by examiner

*Primary Examiner*—Eric S. McCall
(74) *Attorney, Agent, or Firm*—Knobbe, Martens, Olson & Bear, LLP

(57) ABSTRACT

A diagnostic system is provided for aiding a technician or engineer in verifying that a fuel injector in a fuel injected engine is operating properly. The diagnostic system comprises a controller operatively coupled to an actuator for the fuel injector and to a fuel pressure sensor. The controller is configured such that, during a fuel injector test, the controller outputs a signal to the fuel pump so that pressurized fuel is supplied to the fuel injector. After the pressurized fuel is supplied to the fuel injector, the controller outputs a signal to the actuator to operate the fuel injector for a predetermined amount of time. The controller is also configured such that after the predetermined amount of time the fuel pump is turned off.

27 Claims, 5 Drawing Sheets

FAILURE DIAGNOSTIC SYSTEM FOR ENGINE

PRIORITY INFORMATION

This application is based on and claims priority to Japanese Patent Application No. 11-304,106 filed Oct. 26, 1999, the entire contents of which are hereby expressly incorporated by reference.

BACKGROUND OF THE INVENTION

1. Field of the Invention

The present invention relates to engine diagnostics and, in particular, to an improved apparatus and method for verifying the operation of the fuel injectors.

2. Description of the Related Art

Outboard motors are used to power boats and other watercraft. Outboard motors typically include an internal combustion engine that is surrounded by a protective cowling. The internal combustion engine drives a propulsion device such as, for example, a propeller.

In order to improve performance and in particular fuel efficiency and emissions, many outboard motors use a fuel injection system for supplying fuel to the engine. Fuel injection systems typically include fuel injectors that inject fuel into either an air induction device or into a combustion chamber. The fuel injectors typically are opened and closed by electronic actuators, such as, for example, solenoid valves. The electronic actuators, in turn, are controlled by a control system, which usually includes an electronic control unit (ECU). The ECU determines when to open and close the fuel injectors based upon various ambient conditions and engine operating conditions. The fuel injection system therefore improves engine performance by precisely controlling the fuel/air ratio over a wide range of conditions.

As with other types of engines, outboard motors typically include a diagnostic system. The diagnostic system is configured to indicate engine malfunctions and test various engine components. For example, in engines with fuel injection systems, it is desirable to verify that the fuel injectors and their actuators are operating properly. Accordingly, diagnostic systems are configured such that the fuel injectors can be opened and closed while the engine is not operating. By listening to the opening and the closing of the fuel injectors, a technician can verify that the fuel injectors are functioning. There are, however, several problems associated with these types of tests. For example, during the fuel injector test, a large electrical current is applied to the actuators. This causes the fuel injectors to become hot, which can lead to damage.

SUMMARY OF THE INVENTION

Thus, it is an object of the present invention to provide an engine diagnosis system in which the operation of the fuel injectors can be verified without heating the fuel injectors.

Accordingly, one aspect of the of the present invention involves a method for verifying the operation of a fuel injector in a fuel injected engine. The engine includes an electronic control unit that is operatively connected to an actuator configured to open and close the fuel injector. The engine also includes a fuel pump that supplies fuel to the fuel injector. The fuel pump is operated while the engine is generally not in operation. The fuel injector is operated. The diagnostic system determines if the fuel injector has been operating for a specified amount of time. The operation of the fuel injector is stopped if the fuel injector has been operating for a predetermined amount of time. The operation of the fuel pump is then stopped.

Another aspect of the of the present invention involves a diagnostic system for aiding a technician or engineer in verifying that a fuel injector in a fuel injected engine is operating properly. The diagnostic system comprises a controller operatively coupled to an actuator for the fuel injector and to a fuel pressure sensor. The controller is configured such that, during a fuel injector test, the controller outputs a signal to the fuel pump so that pressurized fuel is supplied to the fuel injector. After the pressurized fuel is supplied to the fuel injector, the controller outputs a signal to the actuator to operate the fuel injector for a predetermined amount of time. The controller is also configured such that after the predetermined amount of time the fuel pump is turned off.

Yet another aspect of the present invention involves a method for verifying the operation of a fuel injector in a fuel injected engine. The engine includes an electronic control unit that is operatively connected to an actuator configured to open and close the fuel injector and a fuel pump that supplies fuel to the fuel injector. The fuel injector is operated while the engine is generally not in operation. Fuel is passed through the fuel injector at a reduced fuel pressure in comparison to the fuel pressure present in the fuel injector when the engine is in operation. The operation of the fuel injector is stopped after the fuel injector has been operating for a predetermined amount of time.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features of the invention will now be described with reference to the drawings of the preferred embodiments, which are intended to illustrate and not to limit the invention. The drawings contain the following figures.

DETAILED DESCRIPTION OF THE PREFERRED EMBODIMENT

With initial reference to FIG. 1, an outboard motor 10 with an engine diagnostic system having certain features, aspects and advantages of the present invention will be described. The engine diagnostic system is described in conjunction with an outboard motor to provide an environment in which the invention may be employed. Although the present invention has particular applicability to an outboard motor, it is anticipated that the engine diagnostic system can have utility in other environments of use. In particular, the present invention may also find utility in applications where the engine is compact. used in remote locations, or both. Such applications might include, without limitation. engines in personal watercrafts, small jet boats, and off-road vehicles.

Figure 1:
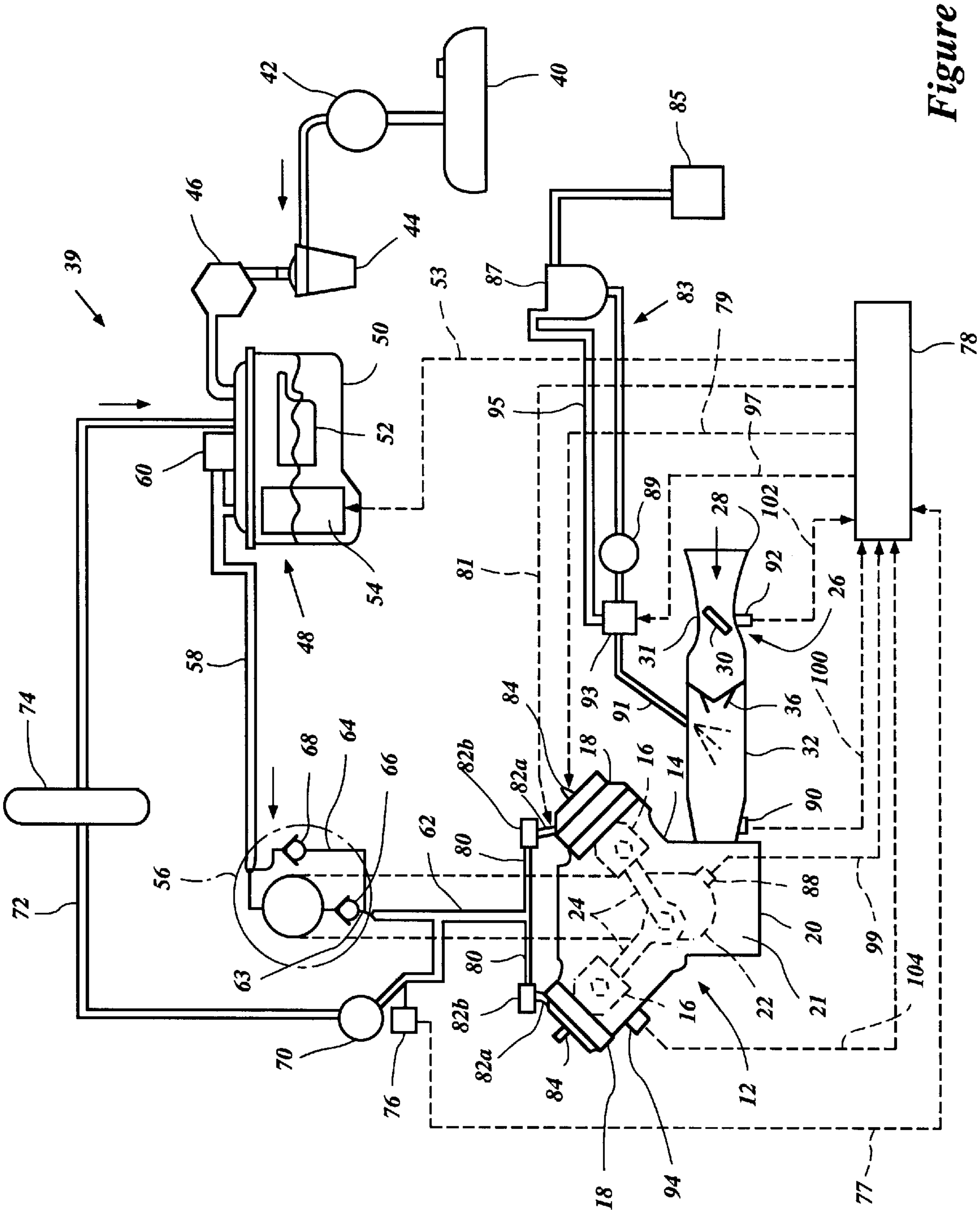
FIG. 1 is a schematic view of an engine of an outboard motor having certain features and advantages according to the present invention. The lower portion of this view shows a top plan view of the engine. The upper portion of this view schematically shows the fuel supply system of the outboard motor. Both the engine and the fuel supply system are connected to an ECU, which is depicted in the lower right hand portion of the view.
Figure 2:
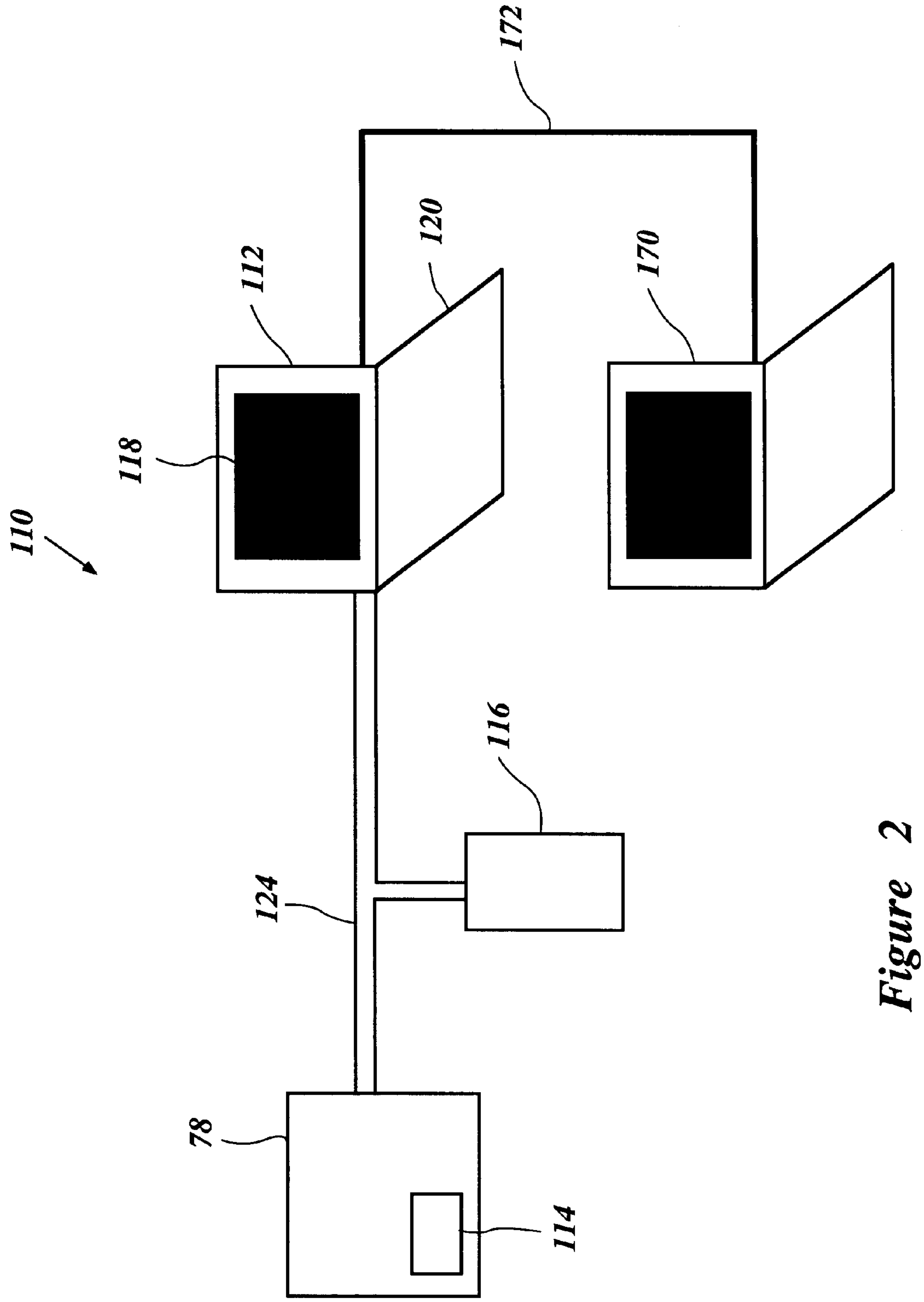
FIG. 2 is a schematic view of the diagnostic system for the outboard motor of FIG. 1. The diagnostic system includes the ECU of FIG. 1 and a computer.

As shown in FIG. 1, the outboard motor 10 includes an engine 12. The illustrated engine operates on a two cycle combustion principle. The engine 12 has a cylinder block 14 that, in the illustrated embodiment, defines six cylinder bores (not shown). A corresponding number of pistons 16 are slidably supported in the cylinder bores for reciprocal movement. The illustrated engine block 14 defines two cylinder banks each of which have three cylinder bores. The cylinder banks are disposed at an angle to each other. As such, the illustrated engine 12 is a two cycle, V6 type engine 12 (i.e., v-type, six cylinder). However, it should be appreciated that several features and advantages of the present invention can be achieved utilizing an engine with a different cylinder configuration (e.g., in-line or opposed), a different number of cylinders (e.g., four) and/or a different principle of operation (e.g., four-cycle, rotary, or diesel principles).

In the illustrated arrangement, a pair of cylinder head assemblies 18 are affixed to one end of the cylinder block 14 to close the cylinder bores. The cylinder head assemblies 18, the cylinder bores and the pistons 16 form the combustion chambers of the engine 12. The other end of the cylinder block 14 is closed with a crankcase member 20, which defines a crankcase chamber 21.

A crankshaft 22 rotates in a crankcase chamber 21. The crankshaft 22 is connected to the pistons 16 by connecting rods 24 and rotates with the reciprocal movement of the pistons 26. As is typical with two cycle crankcase compression engines, the portions of the crankcase chamber 21 associated with each of the cylinder bores are sealed from each other.

The crankshaft 22 is also coupled to a driveshaft (not shown) that depends into and is journaled within a driveshaft housing lower unit assembly (not shown) of the outboard motor. As is typical in outboard motors, the illustrated engine 12 is arranged such that the crank shaft 22 and the drive shaft rotate about a vertically extending axis. The driveshaft drives a propulsion device (not shown) such as, a propeller or jet pump, through a suitable transmission. The propulsion device is selectively driven in forward and reversed directions through a bevel gear reversing transmission (not shown). Since these components are well known in the art, further description of them is not necessary to permit those skilled in the art to practice the invention.

An air induction system, which is indicated generally by the reference numeral 26, supplies an air charge to the crankcase chamber 21. The illustrated induction system 26 includes an air inlet device 28 that may include a silencer (not shown). The air inlet device 28 draws air from within a protective cowling (not shown) that surrounds and protects the engine 12. The protective cowling includes an inlet opening so that air can be drawn in from the surrounding atmosphere.

A throttle valve 30 is provided in each throttle bodies 31 that communicate with the intake device 28. The throttle bodies 31 deliver air to intake manifold runners 32 of an intake manifold assembly. The throttle valves 30 are controlled in any suitable manner. Each intake manifold runner 32 is associated with a respective cylinder bore and communicates with intake ports formed in the crankcase member 20.

Preferably, a reed-type check valve 36 is provided in the manifold runner 32 upstream of the intake port. The reed-type check valves 36 permit an air charge to be drawn into the crankcase chamber 21 when the respective piston 16 is moving upwardly in their cylinder bores. As the respective piston 16 moves downwardly, the charge in the crankcase chamber 21 will be compressed and the respective reed type check valve 36 will close to preclude reverse flow.

As is well known in the art of two-cycle engines, each cylinder bore preferably is provided with a scavenging system such as Schnurl type scavenging system. Accordingly, the cylinder bore preferably includes a pair of side, main scavenge ports and a center, auxiliary scavenge port. Scavenge passages connect the crankcase chamber 21 with each of the scavenge ports. As is well known in two cycle practice, the scavenge ports are opened and closed by the reciprocation of the pistons 16 in the cylinder bores.

Preferably, the main scavenge ports are disposed on opposite sides of an exhaust port which is diametrically opposite the center auxiliary scavenge port. The exhaust ports communicate with exhaust manifolds (not shown) that are formed integrally within the cylinder block 14. The exhaust manifolds terminate in exhaust pipes (not shown) that depend into an expansion chamber (not shown) formed in the driveshaft housing and lower unit. The expansion chamber communicates with a suitable high speed underwater exhaust gas discharge and a low speed above-the-water exhaust gas discharge of any known type.

In the illustrated arrangement, the low pressure fuel pump 46 is located within the protective cowling and collects the fuel from the fuel filter 44 and delivers it to a vapor separator, which is indicated generally by the reference numeral 48. It should be appreciated that the low pressure fuel pumps 48 may be of the type that is operated by crankcase pressure variations. These types of pumps are well known in this art. It should also be appreciated that the outboard motor can have more than one low pressure pump.

As is typical with outboard motor practice, the outboard motor 10 is supplied with fuel from a main fuel tank 40, which is normally located within the hull of the associated watercraft. A hand pump 42 primes a low pressure fuel pump 46 with fuel from the main fuel tank 40. A fuel filter 44 is preferably mounted between the hand pump 42 and the low pressure fuel pump 46 and preferably is located within the protective cowling of the outboard motor 10.

In the illustrated arrangement, the low pressure fuel pump 46 is located within the protective cowling and collects the fuel from the fuel filter 43 and delivers it to a vapor separator, which is indicated generally by the reference numeral 48. It should be appreciated that the low pressure fuel pumps 48 may be of the type that is operated by crankcase pressure variations. These types of pumps are well known in this art. It should also be appreciated that the outboard motor can have more than one low pressure pump.

The illustrated vapor separator 48 includes an outer housing 50 and is mounted at a suitable location within the protective cowling. A valve (not shown) is operated by a float 52 and maintains a level amount of fuel in the vapor separator 48. Contained within the housing 50 is an electrically driven pressure pump 54 that develops a higher fuel pressure than the low pressure fuel pump 48.

The electrically driven pressure pump 54 supplies fuel to a high pressure pump 56, which is preferably a positive displacement, engine driven pump. through a supply conduit 58. The high pressure pump 56 may be of any known type but preferably has one or more plungers (not shown) operated by cams (not shown) for delivering extremely high pressure. A low pressure regulator 60 is connected to the vapor separator 48 and the supply conduit 58. The low pressure regulator 60 regulates the pressure at which fuel is delivered to the high pressure pump 56.

The high pressure pump 56 delivers high pressure fuel to a main fuel manifold 62 through a first conduit 63 and a second conduit 64. The first conduit includes a check valve 66. The second conduit 64 runs parallel to the first conduit and also includes a check valve 68. The check valve 68 in the second conduit 64 prevents high pressure fuel from flowing through the conduit 64.

A high pressure regulator 70 is connected to the main fuel manifold 62. The regulator 70 limits the maximum pressure of the fuel supply by returning fuel back to the vapor separator 48 through a return line 72. A fuel heat exchanger or cooler 74 may be provided in this return line 72 to cool the fuel before it is returned to the vapor separator 48. A fuel pressure sensor 76 is also connected to the main fuel manifold 62. The fuel pressure sensor 76 provides a signal indication of the fuel pressure through sensor line 77 to an Electronic Control Unit 78 (the "ECU"). The ECU 78 controls the engine systems and aids engine diagnostics, as will be described in more detail below.

The main fuel manifold 62 supplies fuel to a pair of fuel rails 80, which are each associated with one of the cylinder banks. The fuel rails 80 supply fuel in a known manner to fuel injectors 82*a*. In the illustrated arrangement, the fuel injectors 82*a* are mounted in the cylinder head assemblies 18; however, they can also be mounted to the cylinder block 14. Preferably, the fuel injectors 82*a* are mounted above the exhaust ports on the exhaust side of the engine 12. These injectors 82*a* spray fuel downwardly toward the heads of the pistons 16. The fuel injectors 82*a* are preferably of the solenoid operated type and have a solenoid valve 82*b* which, when opened, controls the discharge of fuel into the combustion chambers. The ECU 78 controls the opening and closing of the solenoid valves 82*b* via a control line 81. The ECU 78 also controls the electronic pump 54 in the vapor separator 48 through control line 53.

As is well known in the art, spark plugs 84 are mounted in the cylinder head assemblies 18 and have their spark gaps disposed substantially on the axis of the cylinder bores. These spark plugs 84 are fired by an ignition circuit, which is controlled by the ECU 78 through control line 79.

In addition to controlling timing of firing of the spark plugs 84 and initiation and duration of fuel injection by the fuel injectors 82*a*, the ECU 78 preferably also controls a lubricating system 83. The lubricating system 83 includes a first lubrication reservoir 85, which can be located within the watercraft. The lubricating system 83 also includes a second lubrication reservoir 87, which is preferably located within the protective cowling of the outboard motor. To lubricate the engine 12, a lubrication pump 89 draws lubricate from the second reservoir 87 and sprays lubricant through an lubricant supply pipe 91 into the intake manifold runner 32. An electromagnetic solenoid valve, which is preferably controlled by the ECU 78, regulates the amount of lubricant that is supplied to the manifold runner 32. The ECU 78 controls the valve 93 through control line 97. Excess lubricant is returned to the second reservoir 87 via a return pipe 95. Those of skill in the art will recognize that the outboard motor 10 can also include forms of direct lubrication for delivering lubricant directly to certain components of the engine.

The outboard motor 10 also includes various sensors which sense engine running conditions, ambient conditions and/or conditions of the outboard motor 10. As is well known in the art, an engine control system can utilize maps and/or indices stored within the memory of the ECU 78 with reference to the data collected from these various sensors to control the engine 10. As will be explained in more detail below, various sensors can also be used to diagnose problems with the outboard motor. Some of the more important sensors for engine control and engine diagnostics are shown schematically in FIG. 1 and will be described below. It should be appreciated, however, that it is practicable to provide other sensors, such as, for example, a crankcase pressure sensor, an engine temperature sensor, a trim angle sensor, a knock sensor, a neutral sensor, a watercraft pitch sensor, a shift position sensor and an atmospheric temperature sensor that can be used in accordance with various control or the diagnostic strategies described below.

As seen in FIG. 1, a crank angle sensor 88 is associated with the crankshaft 22. The crankshaft position sensor 88 defines a pulse generator that produces pulses as the crankshaft 22 rotates. The pulses are sent to the ECU 78 vial sensor line 99 and indicate the crank angle. The pulses can also be converted to an engine speed within the ECU 78 or another separate converter (not shown) by measuring crankshaft angle versus time.

There is also provided an intake air temperature sensor 90 that senses the air temperature in the intake manifold 32. A throttle position sensor 92 is also located in the intake manifold 32. The throttle position sensor 92 senses the position of the throttle valve 30. Accordingly, the engine or operator demand can be determined. The air temperature sensor 90 and the throttle position sensor are connected to the ECU by sensor lines 100 and 102 respectively.

The outboard motor also preferably includes an air/fuel ratio sensor 94 that is connected to the ECU by sensor line 104. The air/fuel ratio sensor 94 communicates with the combustion chambers or exhaust port of at least one of the combustion cylinders. Preferably, an the air/fuel ratio sensor 94 utilizes an oxygen sensor; however, other types of sensors may be employed.

With reference to FIGS. 2–5, an arrangement for a diagnostic system 110 for the illustrated outboard motor 10 will now be described. As shove in FIG. 2, the illustrated diagnostic system 110 preferably includes the ECU 78 and a computer 112. The ECU 78, as described above, is connected to various engine sensors such as, for example, the air/fuel ratio sensor 94 and the crank angle sensor 88. The ECU 78 preferably includes a data storage device 114, which can be integrated into the ECU 78 or can be a separate component. The function and purpose of the data storage device 114 will be described in more detail below.

The diagnostic system also preferably includes a voltage conversion adapter 116. Voltage conversion adapters are well known in the art and are used to convert a signal from the ECU 78 into a form readable by the computer 112. For example, the voltage adapter 116 can be used to convert a 12 Volt signal, which is common in outboard motors, to a 5 Volt signal. Although the illustrated voltage conversion adapter 116 is separated from the ECU 78 and the computer 112, it should be appreciated that it can also be integrated into the ECU 78 or the computer 112.

The computer 112 is preferably a personal computer with a CPU and supporting industry standard architecture. The computer includes a video display monitor 118 for displaying data and an interface 120 such as a keyboard for inputting data. The computer 112 is connected to the ECU 110 and the voltage conversion adapter 116 by a standard communication cable 124. The computer 112 is also preferably connected to a second computer 170 by a communication cable 172 so that a more experienced technician or engineer also can access data that has been retrieved and/or stored on the computer 112.

The diagnostic system preferably includes several subroutines that are configured to collect and/or store data from the various engine sensors. Examples of suitable subroutines are provided in U.S. patent application Ser. No. 09/579,908, which was filed on May 26, 2000and is hereby expressly incorporated by reference. It should be noted that the ECU 78, which performs these subroutines, may be in the form of a hard wired feed back control circuit that performs the subroutine described below. Alternatively, the ECU 78 can be constructed of a dedicated processor and a memory for storing a computer program configured to perform the steps described above. Additionally, the ECU can be a general purpose computer having a general purpose processor and the memory for storing a computer program for performing the steps and functions described above.

Figure 3:
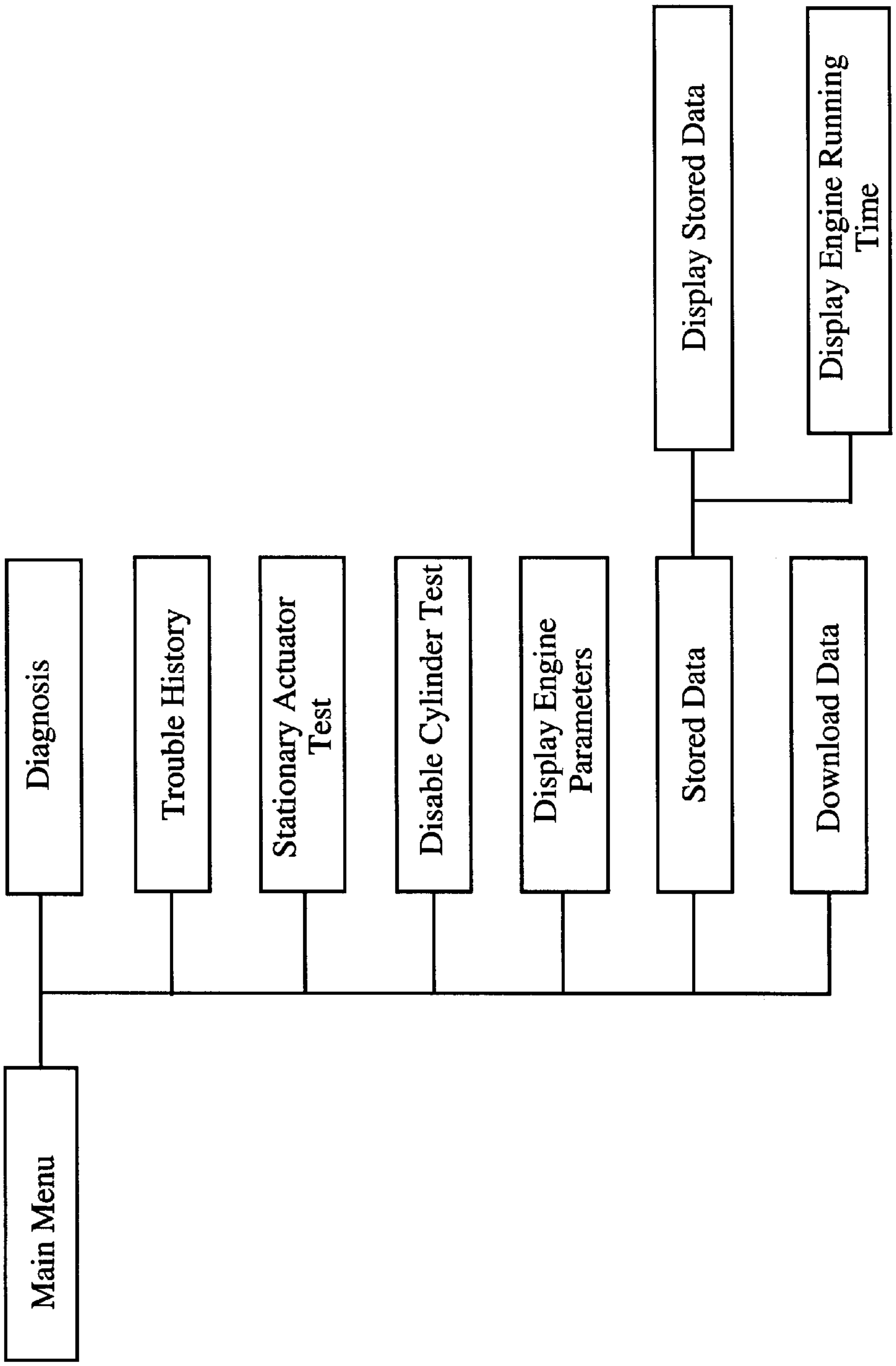
FIG. 3 is a schematic representation of menu options that can be displayed on a display screen of FIG. 2.

The use of the engine diagnostic system 110 will now be described. If the outboard motor abruptly stops during operational period, a technician or engineer can connect a personal computer 118 to the ECU 78 through the voltage conversion adapter 116. The technician or engineer can then use the computer 118 to retrieve (i.e., communicate and upload) and display operational data that has been collected by the ECU 78 and/or stored within the storage device 114. More specifically, the computer 118 includes an interactive computer program that is stored in the computer memory. The computer program can be configured to retrieve data periodically or to retrieve data when a menu option is chosen. Alternatively, the computer program can retrieve data in a large batch and store the retrieved data in the memory of the computer 118. Preferably, the computer program also allows the technician or engineer to view the retrieved data with a menu type format such as the one illustrated schematically in FIG. 3. Accordingly as indicated by FIG. 3, the computer 118 preferably offers the technician or engineer a menu of data choices such as, for example "Diagnosis", "Trouble History", "Stationary Actuator Test", "Disabled Cylinder Test", "Display Engine Parameter", "Stored Data", and "Download Data".

Of these menu options, "Diagnosis", "Trouble History", "Stationary Actuator Test", "Disabled Cylinder Test", "Display Engine Parameter", "Stored Data", and "Download Data" are described in detail in the above-referenced U.S. patent application Ser. No. 09/579,908. Because the operation of these options are not part of the present invention, their operation will not be described further.

The "Stationary Actuator Test" menu option of the diagnostic system 110 is configured to verify the operation of the fuel injectors 82*a* and operates in a manner having certain features and advantages according to the present invention. For example, if the technician or engineer chooses the "Stationary Actuator Test" menu option, the ECU 78 can execute a subroutine 200 such as the one illustrated in FIG. 4. Preferably, before choosing the "Stationary Actuator Test", the technician or engineer removes the protective cowling from the outboard motor 10 to expose the engine 12.

Figure 4:
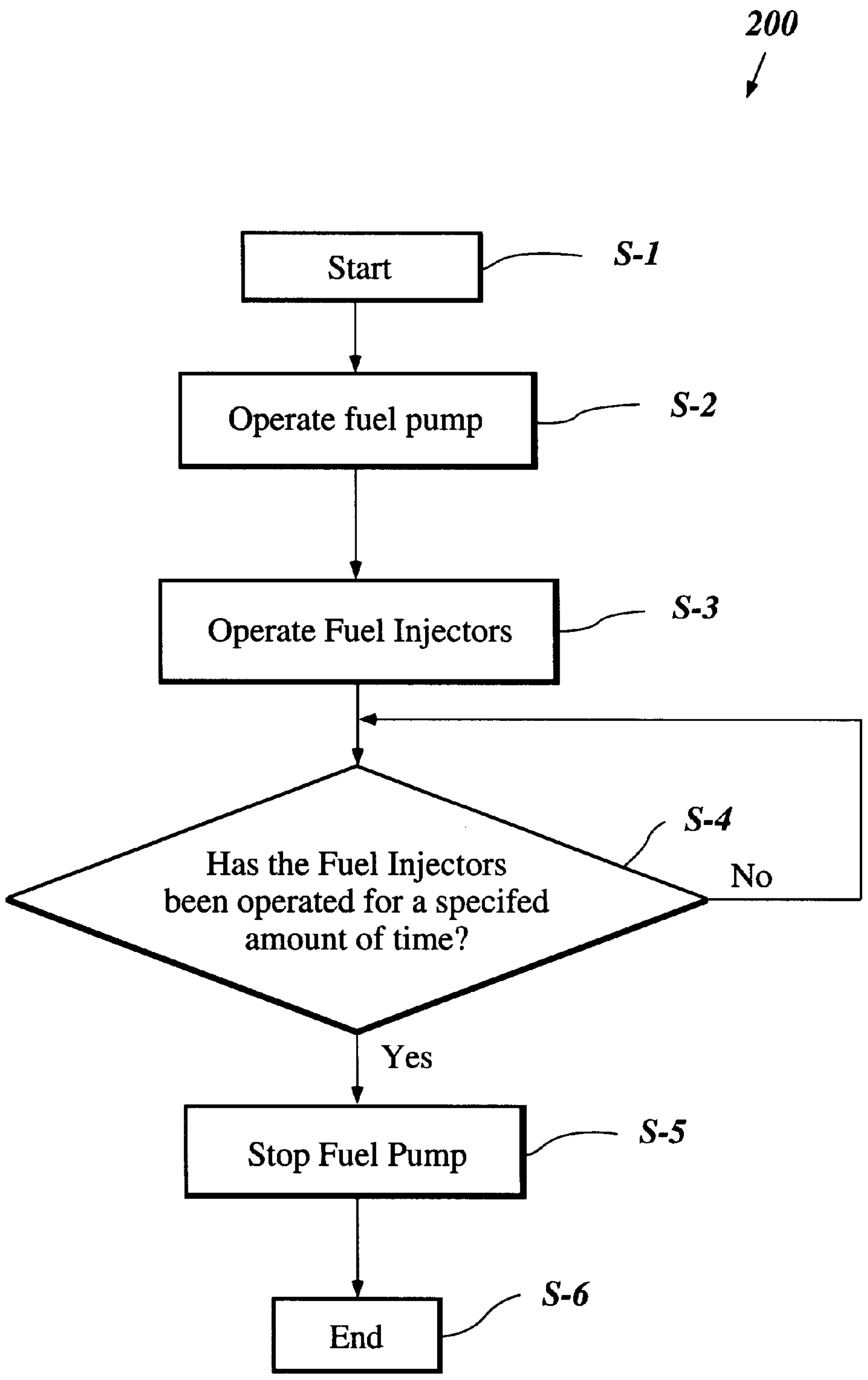
FIG. 4 is a flow diagram of a subroutine that can be used with the ECU of FIG. 1.

As illustrated in FIG. 4 and represented by operational block SI, the routine 200 begins when the "Stationary Actuator Test" menu option is chosen. Of course, the subroutine 200 can be configured to begin in other manners. For example, an independent switch (not shown) can be provided on the outboard motor 10. When actuated, the switch sends a signal to the ECU 78 instructing it to begin the subroutine 200. After the subroutine 200 begins, the electric fuel pump 54 is turned on, as indicated by operational block S-2. Accordingly, the electric fuel pump 54 supplies pressurized fuel to the fuel injectors 82*a*. Preferably, the electric fuel pump 54 is operated such that the fuel pressure at the fuel injectors 82*a* is less than the fuel pressure during normal engine operating conditions. For example, the fuel pressure at the fuel injectors 82*a* during normal operations in an outboard motor is typically about 5 MPa (50 $kg/cm^2$). In the preferred arrangement, the fuel pressure at the fuel injectors 82*a* during the "Stationary Actuator Test" is approximately 0.3 MPa (3 $kg/cm^2$). This arrangement prevents too much fuel from entering the combustion chamber, which can cause the engine to flood. The fuel pressure, however, is large enough such that enough fuel flows through the fuel injectors 82*a* to sufficiently cool the fuel injectors 82*a*.

After the electric fuel pump 54 is turned on, the fuel injectors 82*a* are operated, preferably, by having the ECU 78 send a control signal to the solenoid valves 83*b* of the fuel injectors 82*a*. The fuel injectors 82*a* are opened and closed for a specified amount of time (see decisional block S-4). Preferably, the specified amount of time is the minimum amount of time in which the engineer or technician would typically require to verify the operation (i.e., the opening and closing) of the fuel injectors 82*a*. Moreover, the fuel injectors 82*a* preferably are kept open as little as possible to limit the amount of fuel injected into the combustion chamber. In the preferred arrangement, the fuel injectors 82*a* are opened for approximately 1 millisecond. Moreover, the interval duration (a cycle of opening and closing the fuel injector once) is approximately 100 milliseconds. The specified amount of time is approximately 2 seconds, which corresponds to the fuel injectors 82*a* being opened and closed approximately 20 times.

After the fuel injectors 82*a* are operated for the specified amount of time, the electric fuel pump 54 is turned off, as represented by operational block S-5. The subroutine 200 then ends (operational block S-6).

This above-described arrangement for verifying the operation of the fuel injectors 82*a* has several advantages. In the prior art, the fuel injectors 82*a* have a tendency to overheat during such verification tests because of the large electrical current supplied to the solenoid valves 82*b*. To prevent overheating, in this arrangement, a small amount of fuel is supplied to the fuel injectors 82*a* during the test. The fuel cools the fuel injectors 82*a* such that they do not overheat. Moreover, the fuel injectors 82*a* are operated for a period that is no longer than is necessary for the technician or engineer can verify their operation. This arrangement also prevents too much fuel from entering the combustion chambers, which can cause the engine to flood. Specifically, the fuel pressure preferably is kept below the normal operating pressure and the fuel injectors 82*a* are kept open as little a possible.

Figure 5:
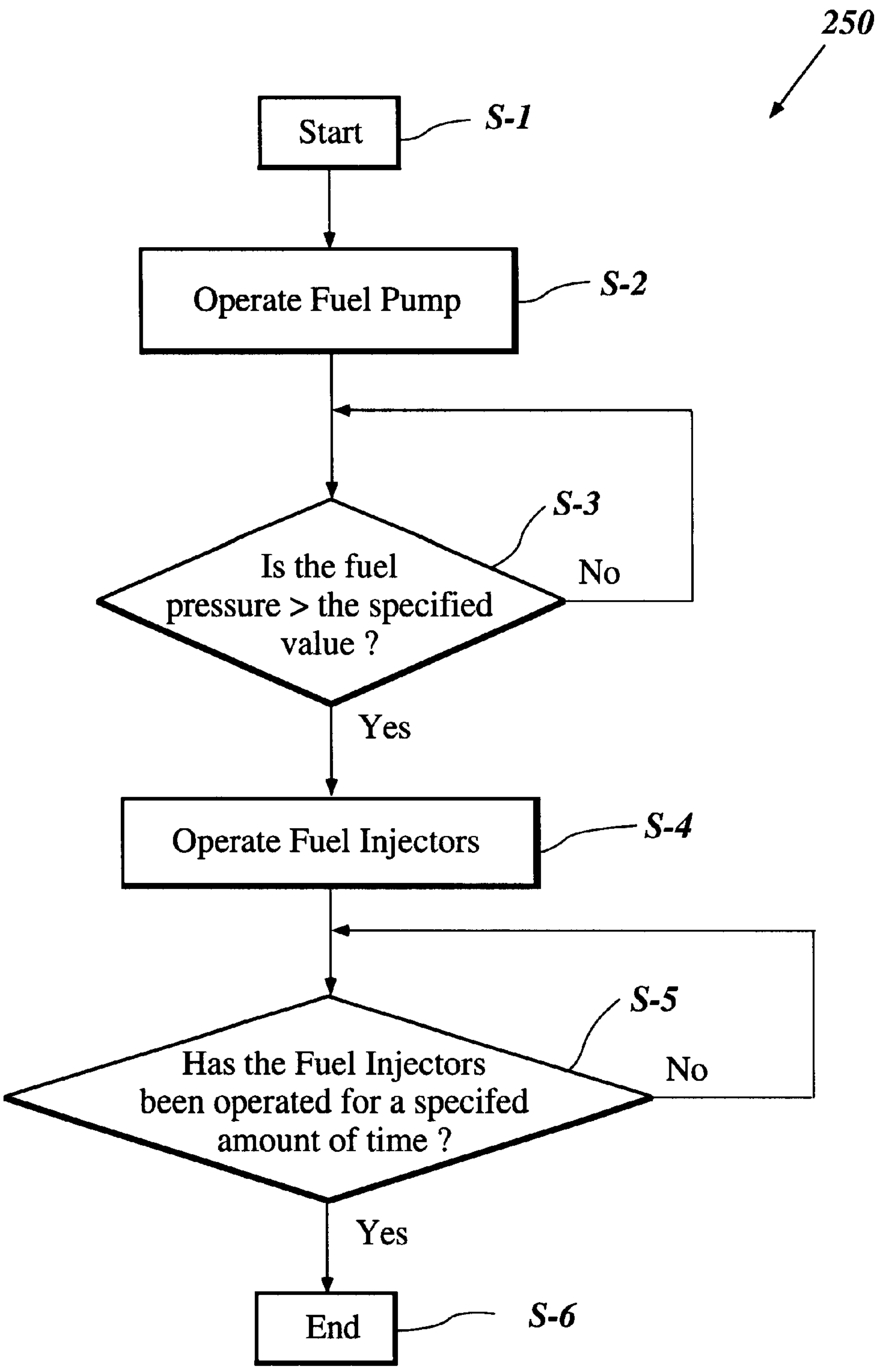
FIG 5 is a flow diagram of a subroutine that can be used with the ECU of FIG. 1

FIG. 5 illustrates a modified arrangement of a subroutine 250 that can be executed by the ECU 110 and has certain features and advantages according to the present invention. The routine 250 begins when the "Stationary Actuator Test" menu option is chosen. Of course, as mentioned above, the subroutine 250 can be configured to begin in other manners.

After subroutine 250 begins, the electric fuel pump 54 is turned on to provide pressurized fuel to the fuel injectors 82*a*, as indicated by operational block S-2. As mentioned above, the electric fuel pump 54 is operated such that the fuel pressure at the fuel injectors 82*a* is less than the fuel pressure during normal operating conditions.

After the electric fuel pump 54 is turned on, the routine 250 determines if the fuel pressure is greater than a specified value (see S-3). Preferably, the specified value is a fuel pressure at which enough fuel is supplied to the fuel injectors 82*a* to sufficiently cool the fuel injectors 82*a* during the test. For example, in the preferred arrangement, the specified value is approximately 0.2 MPa (2 kg/cm$^2$). In the illustrated arrangement, the fuel pressure is measured by the fuel pressure sensor 76, which is operatively connected to the ECU 78. This arrangement ensures that the fuel injectors 82*a* are not operated until a sufficient about of fuel can be supplied to the fuel injectors 82*a* to prevent overheating. Once the fuel pressure reaches the specified value, the fuel injectors 82*a* are operated (i.e., opened and closed), as indicated by operational block S-4. Preferably, this is done by sending a control signal from the ECU 78 to the solenoid valves of the fuel injectors 82*a*. The fuel injectors 82*a* are opened and closed for a specified amount of time (see decisional block S-5). As with the previous routine 200, the specified amount of time just long enough so that the engineer or technician can verify that the fuel injectors 82*a* are opening and closing. After the fuel injectors 82*a* are operated for the specified amount of time, the fuel pump 56 is turned off and the subroutine 200 ends (operational block S-6).

It should be noted that the subroutines described above can be stored in the storage device 114 or the computer 118. In the later arrangement, the computer 118 can instruct the ECU 78 to send control signals to the relevant actuators or the computer 118 can by pass the ECU 78 and send control signals directly to the relevant actuators.

It should also be noted that, in the illustrated arrangement, the sensors of the outboard motor 10 are hardwired directly to the ECU 78. However, it is anticipated that any number of quick disconnect electrical couplings can be provided between the sensors and the ECU 78. In addition, it is anticipated that the connection between the sensors and the ECU 78 can have any suitable configuration. For instance, but without limitation, the components can be connected by a physical wire, by infrared signals, by radio waves or any suitable manner. In addition, control signals can be sent between the ECU 78 and the receptor controlled components (e.g., fuel injectors 82*a*) in any of the above-described manners as well.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Moreover, many of the steps of the routines described above can be performed in various orders, as will be well understood by one skilled in the art from the above description, while still carrying out one or more objects or advantages of the present invention. Thus, it is intended that the scope of the present invention herein disclosed should not be limited by the particular disclosed embodiments described above, but should be determined only by a fair reading of the claims that follow.

What is claimed is:

1. A method for verifying operation of a fuel injector in a fuel injected engine, the engine comprising an electronic control unit that is operatively connected to an actuator configured to open and close the fuel injector and an electric fuel pump that supplies fuel to the fuel injector during normal engine operations, the method comprising:

operating the electric fuel pump;

operating the fuel injector while the engine is not in operation;

determining if the fuel injector has been operating for a specified amount of time;

stopping the operation of the fuel injector if the fuel injector has been operating for a predetermined amount of time; and stopping the operation of the electric fuel pump.

2. The method of claim 1, wherein the predetermined amount of time at least is approximately equal to a minimum amount of time necessary for a technician to audibly verify the operation of the fuel injector.

3. The method of claim 1, wherein operating the electric fuel pump further includes operating the electric fuel pump so as to produce a fuel pressure at the fuel injector that is less than the fuel pressure at the fuel injector during normal outboard motor operations.

4. The method of claim 1, further comprising sensing a fuel pressure and determining if the fuel pressure is greater than a predetermined value.

5. The method of claim 4, wherein the fuel injector is operated only if the fuel pressure is greater than the predetermined value.

6. The method of claim 4, wherein the predetermined value is chosen so as to provide enough fuel to the fuel injector so as to prevent the fuel injector from overheating during the method for verifying the operation of the fuel injector.

7. The method of claim 1, further comprising connecting a controller to an outboard motor and removing a protective cowling that surrounds the engine.

8. A diagnostic system for aiding a technician or engineer in verifying that a fuel injector in a fuel injected engine is operating properly, the diagnostic system comprising a controller operatively coupled to an actuator for the fuel injector and to a fuel pressure sensor, the controller being configured such that, during a fuel injector test, the controller outputs a signal to an electric fuel pump that supplies fuel to the engine during normal engine operation so that pressurized fuel is supplied to the fuel injector and after pressurized fuel is supplied to the fuel injector the controller outputs a signal to the actuator to operate, the fuel injector for a predetermined amount of time while the electric fuel pump continues to operate, the controller also being configured such that after the predetermined amount of time the electric fuel pump is turned off.

9. The diagnostic system of claim 8, wherein the predetermined amount of time at least is approximately equal to a minimum amount of time for a technician to audibly verify the operation of the fuel injector.

10. The diagnostic system of claim 8, wherein the controller is furthered configured to send a signal to the electric fuel pump such that a fuel pressure at the fuel injector is less than the fuel pressure at the fuel injector during normal outboard motor operations.

11. The diagnostic system of claim 8, wherein the controller is further configured to receive a signal from a fuel pressure sensor indicating a fuel pressure and determine if the fuel pressure is greater than a predetermined value.

12. The diagnostic system of claim 11, wherein the controller is further configured to operate the fuel injector after the fuel pressure is greater than a predetermined value.

13. The diagnostic system of claim 11, wherein the predetermined value is chosen so as to provide enough fuel to the fuel injector to prevent the fuel injector from overheating during the fuel injector test.

14. A method for verifying operation of a fuel injector in a fuel injected engine, the engine comprising an electronic control unit that is operatively connected to an actuator configured to open and close the fuel injector and an electric fuel pump that supplies fuel to the fuel injector during normal engine operations, the method comprising:

operating the fuel injector while the engine is not in operation;

passing fuel through the fuel injector, while the engine is not in operation, at a reduced fuel pressure in comparison to the fuel pressure present in the fuel injector when the engine is in operation; and stopping the operation of the fuel injector after the fuel injector has been operating for a predetenmined amount of time.

15. The method of claim 14, wherein the predetermined amount of time is at least approximately equal to a minimum amount of time necessary for a technician to audibly verify the operation of the fuel injector.

16. The method of claim 14, further comprising sensing a fuel pressure and determining if the fuel pressure is greater than a predetermined value.

17. The method of claim 16 wherein the fuel injector is operated only if the fuel pressure is greater than the predetermined value.

18. The method of claim 16, wherein the predetermined value is chosen so as to provide enough fuel to the fuel injector so as to prevent the fuel injector from overheating during the method for verifying the operation of the fuel injector.

19. The method of claim 14, further comprising connecting a controller to an outboard motor and removing a protective cowling that surrounds the engine.

20. The method of claim 1, wherein operating the electric fuel pump further includes operating the electric fuel pump so as to produce a fuel pressure at the fuel injector that is less than the fuel pressure at the fuel injector during normal engine operation.

21. The method of claim 4, wherein the predetermined value of pressure provides enough fuel to the fuel injector so as to prevent the fuel injector from overheating during the method for verifying the operation of the fuel injector.

22. The diagnostic system of claim 8, wherein the controller is furthered configured to send a signal to the electric fuel pump such that a fuel pressure at the fuel injector is less than the fuel pressure at the fuel injector during normal engine operation.

23. The diagnostic system of claim 11, wherein the predetermined value of pressure provides enough fuel to the fuel injector to prevent the fuel injector from overheating during the fuel injector test.

24. The method of claim 16, wherein the predetermined value of pressure provides enough fuel to the fuel injector so as to prevent the fuel injector from overheating during the method for verifying the operation of the fuel injector.

25. The diagnostic system of claim 8, wherein the actuator for the fuel injector is an electronic control unit configured to collect and store engine operational data.

26. The diagnostic system of claim 25, wherein the controller is configured to retrieve the engine operational data stored in the electronic control unit.

27. A method for verifying operation of a fuel injector in a fuel injected engine, the engine comprising an electronic control unit that is operatively connected to an actuator configured to open and close the fuel injector and an electric fuel pump that supplies fuel to the fuel injector during normal engine operations, the method comprising:

maintaining a pressure in a portion of the fuel system with an electric fuel pump;

operating the fuel injector while the pressure is maintained in the fuel system and while the engine is not in operation;

determining if the fuel injector has been operating for a specified amount of time;

stopping the operation of the fuel injector if the fuel injector has been operating for a predetermined amount of time; and stopping the operation of the electric fuel pump after determining that the fuel injector has been operating for the specified amount of time.

* * * * *

UNITED STATES PATENT AND TRADEMARK OFFICE

CERTIFICATE OF CORRECTION

PATENT NO. : 6,647,769 B1
DATED : November 18, 2003
INVENTOR(S) : Kenichi Fujino et al.

It is certified that error appears in the above-identified patent and that said Letters Patent is hereby corrected as shown below:

Title page,
Item [56], References Cited, please add the following:

-- OTHER PUBLICATIONS

Outboard Marine Corporation, OMC Diagnostic Software User's Guide, 1997, p11-12 --

Signed and Sealed this

Sixth Day of April, 2004

JON W. DUDAS

*Acting Director of the United States Patent and Trademark Office*

UNITED STATES PATENT AND TRADEMARK OFFICE

CERTIFICATE OF CORRECTION

PATENT NO. : 6,647,769 B1

DATED : November 18, 2003

INVENTOR(S) : Kenichi Fujino et al.

It is certified that error appears in the above-identified patent and that said Letters Patent is hereby corrected as shown below:

Column 10,

Line 30, after “operating the fuel injector while”, please insert -- the electric fuel pump is operating and while --.

Line 38, after “the electric fuel pump”, please insert -- after determining if the fuel injector has been operating for the specified amount of time. --

Column 11,

Line 7, after “a predetermined amount of time while”, please insert -- the engine is not running and while --.

Line 39, after “operating the fuel injector, while”, please insert -- the electric fuel pump is operating and while --.

Line 45, after “a predetermined amount of time”, please insert -- wherein the fuel pump operation is continued until the operation of the fuel injector is stopped. --

Signed and Sealed this

Fifth Day of April, 2005

JON W. DUDAS

*Director of the United States Patent and Trademark Office*